(12) United States Patent
Hirao

(10) Patent No.: US 9,261,405 B2
(45) Date of Patent: Feb. 16, 2016

(54) INTERFEROMETER AND SPECTROMETER INCLUDING SAME

(75) Inventor: Yusuke Hirao, Takatsuki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/131,828

(22) PCT Filed: Jun. 14, 2012

(86) PCT No.: PCT/JP2012/065262
§ 371 (c)(1),
(2), (4) Date: Jan. 9, 2014

(87) PCT Pub. No.: WO2013/008580
PCT Pub. Date: Jan. 17, 2013

(65) Prior Publication Data
US 2014/0152993 A1  Jun. 5, 2014

(30) Foreign Application Priority Data
Jul. 13, 2011 (JP) ................................. 2011-154948

(51) Int. Cl.
*G01B 9/02* (2006.01)
*G01J 3/45* (2006.01)
*G01J 3/453* (2006.01)
(Continued)

(52) U.S. Cl.
CPC .............. *G01J 3/4532* (2013.01); *G01J 3/027* (2013.01); *G01J 3/0289* (2013.01); *G01J 3/45* (2013.01); *G01J 3/4535* (2013.01); *G01J 9/02* (2013.01)

(58) Field of Classification Search
CPC ........... G01B 9/02028; G01B 9/02061; G01B 9/02071; G01B 2290/60; G01J 3/0027; G01J 3/0289; G01J 3/45; G01J 3/4532; G01J 3/4535; G01J 9/02
See application file for complete search history.

(56) References Cited

U.S. PATENT DOCUMENTS

| 5,114,232 A | 5/1992 | Tsuji et al. |
| 5,561,521 A | 10/1996 | Chase et al. |
| 2002/0196450 A1* | 12/2002 | Olszak et al. ................. 356/511 |

(Continued)

FOREIGN PATENT DOCUMENTS

| JP | 01-282434 A | 11/1989 |
| JP | 03-202728 A | 9/1991 |

(Continued)

OTHER PUBLICATIONS

International Search Report in International Application No. PCT/JP2012/065262 mailed Jul. 10, 2012, 3 pages.

(Continued)

*Primary Examiner* — Michael A Lyons
(74) *Attorney, Agent, or Firm* — Brinks Gilson & Lione

(57) ABSTRACT

An optical path of measurement light emitted from a measurement light source is overlaid by a beam combiner on an optical path of reference light emitted from a reference light source. The measurement light emitted from the measurement light source includes light in the sensitivity wavelength range (S1) of a measurement light detector and light in the sensitivity wavelength range (S2) of a reference light detector. An interferometer includes a wavelength separation filter that cuts light in at least a part of the sensitivity wavelength range (S2) of the reference light detector, of light included in the wavelength range of the measurement light.

4 Claims, 7 Drawing Sheets

(51) Int. Cl.
*G01J 3/02* (2006.01)
*G01J 9/02* (2006.01)

(56) References Cited

U.S. PATENT DOCUMENTS

| | | | | |
|---|---|---|---|---|
| 2005/0259250 | A1* | 11/2005 | Simon | 356/300 |
| 2006/0262316 | A1* | 11/2006 | Baney | 356/451 |
| 2007/0087445 | A1* | 4/2007 | Tearney et al. | 436/172 |
| 2012/0287439 | A1* | 11/2012 | Hirao | 356/451 |
| 2013/0222790 | A1* | 8/2013 | Hirao, Yusuke | 356/51 |

FOREIGN PATENT DOCUMENTS

| | | | |
|---|---|---|---|
| JP | 06-003401 | B2 | 1/1994 |
| JP | 07-286902 | A | 10/1995 |
| JP | 08-292266 | A | 11/1996 |
| JP | 08-338763 | A | 12/1996 |
| JP | 11-083737 | A | 3/1999 |
| JP | 2009-511921 | A | 3/2009 |

OTHER PUBLICATIONS

English language machine translation of JP11-083737, published by Japanese Patent Office, publicly available Jun. 4, 2015, 30 pages.

Office Action for corresponding Japanese Application No. 2013-523868, mailed Mar. 10, 2015, 3 pages.

Rogalski, A., Infrared Detectors, 2nd Edition, published by CRC Press, Boca Raton, Florida, Nov. 15, 2010, p. 29.

* cited by examiner

INTERFEROMETER AND SPECTROMETER INCLUDING SAME

This application is a National Stage application of International Application No. PCT/JP2012/065262, filed Jun. 14, 2012.

TECHNICAL FIELD

The present invention relates to a Michelson interferometer and a spectrometer including such an interferometer.

BACKGROUND ART

A Michelson two-beam interferometer utilized for FTIR (Fourier Transform Infrared Spectroscopy) in a spectrometer is configured to divide, with a beam splitter, measurement light (for example, near-infrared light) in two directions of a fixed mirror and a moving mirror, and to combine, with the beam splitter, light reflected off the fixed mirror and light reflected off the moving mirror into one optical path. When the moving mirror is moved back and forth (in the direction of the optical axis of entrance light), since the optical path difference of the two light beams divided is changed, the combined light becomes measurement interference light (interferogram) whose intensity is changed according to the amount of movement of the moving mirror. This interferogram is sampled and is subjected to AD conversion and Fourier transform, and thus it is possible to determine the spectrum distribution of the entrance light, with the result that it is possible to determine, from the spectrum distribution, the intensity of the measurement interference light per number of waves (1/wavelength).

Since the interferogram described above is indicated by a function of the phase difference of the moving mirror and the fixed mirror, that is, a function of the optical path difference of the light reflected off the moving mirror and the light reflected off the fixed mirror, when the interferogram is sampled and thus its intensity is determined, in general, it is necessary to monitor the position of the moving mirror with a reference light source in addition to a light source that emits the measurement light. Specifically, reference light (for example, laser light) emitted from the reference light source is divided with a beam splitter and guided to the moving mirror and the fixed mirror, the light reflected off the moving mirror and the light reflected off the fixed mirror are combined with the beam splitter and the combined light is guided as reference interference light to a reference light detector for position detection. Since the intensity of the reference interference light is changed according to the position of the moving mirror, variations in the intensity of the reference interference light are detected with the reference light detector, and thus it is possible to determine the position (the optical path difference of the two light beams divided) of the moving mirror.

In this respect, for example, in patent document 1, the optical path of laser light serving as reference light is provided side by side with the optical path of measurement light, and, based on the result of detection of the laser light by a reference light detector, a signal indicating timing at which interferogram is sampled is produced.

In recent years, much attention has been focused on safety and security, and trace detection and high-precision detection have been required in various fields. In particular, in the inspection of medicines in pharmaceutical research laboratories and the like and in hospitals in the medical field, it is important to identify samples with high precision. For example, in order to realize a high-precision measurement, patent document 2 discloses a configuration in which unnecessary light included in measurement light is cut by an optical bandpass filter.

RELATED ART DOCUMENT

Patent Document
Patent document 1: JP-A-7-286902 (see claim 1, FIG. 1 and the like)
Patent document 2: JP-A-1-282434 (see the scope of claims, FIG. 1 and the like)

DISCLOSURE OF THE INVENTION

Problems to be Solved by the Invention

Incidentally, in an interferometer, in order to reduce its size so that it becomes potable, it is important to adopt a compact size. However, in the configuration of patent document 1, since the optical path of the measurement light and the optical path of the reference light are provided side by side, the sizes of the reflective surfaces of the fixed mirror and the moving mirror need to be increased, with the result that the size of the interferometer is increased. When the sizes of the reflective surfaces are increased, since the effective areas of the reflective surfaces are increased, it is difficult to acquire the accuracy of the reflective surfaces, with the result that it is impossible to maintain satisfactory interference performance.

Although patent document 2 does not disclose at all a configuration in which a reference optical system including a reference light source is incorporated, even if the reference optical system is incorporated, since the relationship between a wavelength range where unnecessary light included in the measurement light is cut and the wavelength of the reference light and the sensitivity wavelength range of the reference light detector is not clear, it is not necessarily possible to detect the reference light with high precision when the light in the sensitivity wavelength range of the reference light detector is included in the measurement light. In particular, in recent years, although VCSEL (Vertical Cavity Surface Emitting Laser) light sources which are small-sized, highly accurate and inexpensive have been developed, such laser light sources cannot obtain a high output in terms of their structures. Hence, even when such a laser light source producing a low output is used as the reference light source, it is desirable to highly accurately detect the reference light with the reference light detector and to measure the measurement light while accurately detecting the optical path difference of the two light beams.

The present invention is made to solve the foregoing problem; an object of the present invention is to provide an interferometer that is small-sized and can maintain satisfactory interference performance, that detects reference light with high precision and that can measure the measurement light while detecting the optical path difference of two light beams with high precision even when light in the sensitivity wavelength range of a reference light detector is included in measurement light.

Means for Solving the Problem

According to one aspect of the present invention, there is provided an interferometer including: a measurement light source that emits measurement light; a measurement light detector that detects the measurement light; a reference light source that emits, as reference light, laser light whose wavelength is shorter than a sensitivity wavelength range of the measurement light detector; a reference light detector that detects the reference light; a beam combiner that overlays an optical path of the measurement light and an optical path of the reference light; a first beam splitter that separates, into two light beams, each of the measurement light and the reference light entering through the beam combiner; a first reflective member that is arranged on an optical path of one of the two light beams separated by the first beam splitter and that reflects and makes each of the measurement light and the reference light enter the first beam splitter again; a second reflective member that is arranged on an optical path of the other of the two light beams separated by the first beam splitter and that reflects and makes each of the measurement light and the reference light enter the first beam splitter again; and a second beam splitter that separates, into two light beams, light which is subjected to interference in the first beam splitter and emitted by the first beam splitter, and that guides the light beams to the measurement light detector and the reference light detector, where, based on a result of detection by the reference light detector when the first reflective member and the second reflective member are relatively moved, the interferometer measures the measurement light while detecting an optical path difference of the two light beams separated by the first beam splitter, the measurement light emitted from the measurement light source includes light in a sensitivity wavelength range of the measurement light detector and light in a sensitivity wavelength range of the reference light detector and the interferometer further includes a wavelength separation filter that cuts light in at least a part of the sensitivity wavelength range of the reference light detector, of light included in a wavelength range of the measurement light.

Advantages of the Invention

As described above, the optical path of the measurement light is overlaid on the optical path of the reference light by the beam combiner, and thus it is possible to decrease the effective areas of the reflective surfaces of the first and second reflective members, with the result that it is possible to reduce the size of the interferometer, and it is also possible to maintain satisfactory interference performance by sufficiently acquiring the accuracy of the reflective surfaces as compared with the configuration in which these optical paths are arranged side by side.

Even if the measurement light includes light in the sensitivity wavelength range of the reference light detector, the wavelength separation filter cuts light in at least part of the sensitivity wavelength range of the reference light detector, of the light included in the wavelength range of the measurement light. In this way, even when an output of the reference light emitted from the reference light source is small, it is possible to detect the reference light with high precision and measure the measurement light while detecting the optical path difference of the two light beams with high precision.

BEST MODE FOR CARRYING OUT THE INVENTION

<Embodiment 1>

An embodiment of the present invention will be described below with reference to drawings. Common configurations in each embodiment are identified with common member numbers, and their description may be omitted.

[Configuration of a Spectrometer and an Interferometer]

Figure 1:
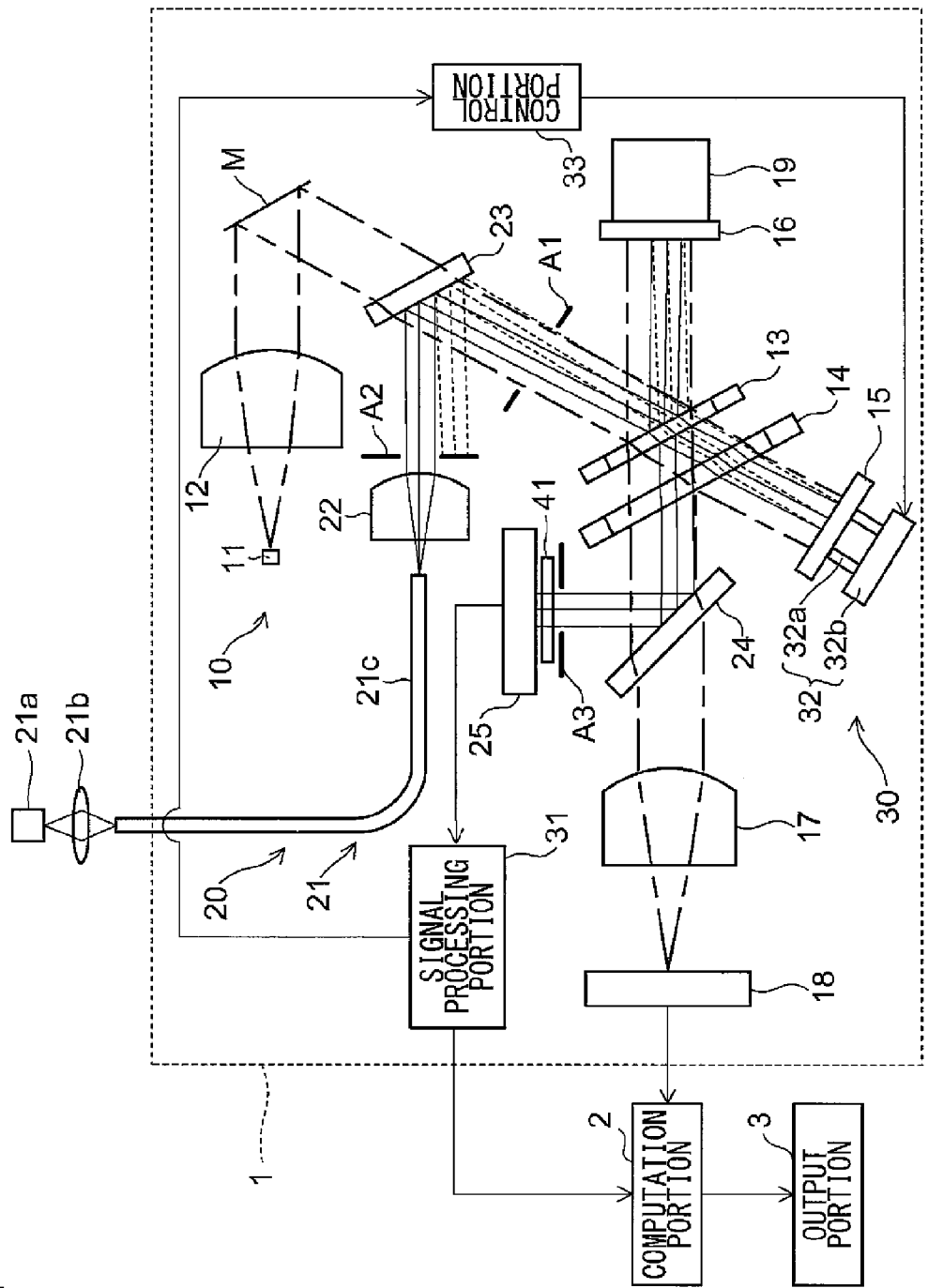
[FIG. 1] An illustrative diagram schematically showing a schematic configuration of a spectrometer according to an embodiment of the present invention.

FIG. 1 is an illustrative diagram schematically showing a schematic configuration of a spectrometer (Fourier transform spectrometer) according to the present embodiment. This spectrometer includes an interferometer 1, a computation portion 2 and an output portion 3. The interferometer 1 is formed with a two-optical path branched Michelson interferometer; it will be described in detail later.

The computation portion 2 samples an output from a measurement light detector 18 in synchronization with a sampling signal generated in a signal processing portion 31, which will be described later, performs A/D conversion and Fourier transform and thereby functions as a spectrum generation portion to generate a spectrum of a wavelength included in measurement light, that is, a spectrum indicating the intensity of light per number of waves (1/wavelength). The output portion 3 outputs (for example, displays) the spectrum generated in the computation portion 2. The interferometer 1 will be described in detail below.

The interferometer 1 includes a measurement optical system 10, a reference optical system 20 and an optical path correction portion 30. They will be described below in turn.

(Measurement Optical System)

The measurement optical system 10 includes a measurement light source 11, a measurement light collimator optical system 12, a return mirror M, a BS (beam splitter) 13, a compensation plate 14, a fixed mirror 15, a moving mirror 16, a light collection optical system 17, the measurement light detector 18 and a drive mechanism 19. The positional relationship between the fixed mirror 15 and the moving mirror 16 with respect to the BS 13 may be opposite.

The measurement light source 11 emits the measurement light; it is formed with a light source alone or is formed with a fiber combination optical system obtained by combining a light source and an optical fiber. In the latter case, the light source may be provided outside the interferometer 1; in this case, it is possible to deal with, as the measurement light source 11, an end surface on the light emission side of a light guide member (optical fiber) that guides light emitted from the light source. The measurement light collimator optical system 12 is an optical system that converts the measurement light emitted from the measurement light source 11 into collimated light and that guides it to the BS 13; the measurement light collimator optical system 12 is formed with, for example, a collimator lens.

Here, the collimated light conceptually includes completely parallel light and substantially parallel light (some convergent light and divergent light). Specifically, the "collimate" here refers to the guiding of the light from the light source by the collimator optical system through the BS and the fixed mirror or the moving mirror to a sensor, and is not limited to collimation to infinite distance. In order to deal with light as planar waves more easily, it is preferable for the measurement light collimator optical system 12 to collimate entrance light, for example, one meter or more away.

In order to make the interferometer 1 compact, the return mirror M is provided to bend the optical path between the measurement light collimator optical system 12 and the BS 13. In the optical path between the return mirror M and the BS 13 (especially in the optical path between an optical path combination mirror 23, which will be described later, and the BS 13), an aperture A1 that regulates the diameter of the light beam of the measurement light is arranged.

The BS 13 (first beam splitter) divides, into two types of light, entrance light, that is, the measurement light which is emitted from the measurement light source 11 and which enters through the optical path combination mirror 23, which will be described later, guides the types of light to the fixed mirror 15 and the moving mirror 16, respectively, combines the individual types of light reflected off the fixed mirror 15 and the moving mirror 16 and emits the combined light as interference light; the BS 13 is formed with, for example, a half mirror having a branching ratio of 50 to 50. The measurement light that has been subjected to interference in the BS 13 is particularly referred to as measurement interference light.

The compensation plate 14 is a substrate for correcting the optical path length corresponding to the thickness of the BS 13 and an optical path shift caused by refraction when the light passes through the BS 13. It is possible to omit the compensation plate 14 depending on how the interferometer 1 is assembled.

The fixed mirror 15 and the moving mirror 16 form a first reflective member and a second reflective member, respectively, that reflect two light beams into which the measurement light and reference light, which will be described later, are divided by the BS 13, that make them re-enter the BS 13, that makes them interfere with each other and that move relative to each other so as to produce an optical path difference between the two light beams.

The light collection optical system 17 is an optical system that collects the light combined and emitted by the BS 13 and that guides it to the measurement light detector 18; the light collection optical system 17 is formed with, for example, a focus lens. The measurement light detector 18 is a sensor that detects the measurement light (measurement interference light, an interferogram and an interference pattern) which enters from the BS 13 through the light collection optical system 17; the measurement light detector 18 is formed with, for example, an NIR (Near Infrared) sensor. The wavelength range (sensitivity wavelength range) over which the measurement light detector 18 has a detection sensitivity is, for example, 1200 to 2500 nm.

The drive mechanism 19 is a movement mechanism that moves (translates) the moving mirror 16 parallel to the optical axis direction such that the difference (the difference in the optical path length) between the optical path of the light reflected off the fixed mirror 15 and the optical path of the light reflected off the moving mirror 16 is changed; the drive mechanism 19 is formed with, for example, an electromagnetic drive mechanism using a VCM (voice coil motor). The drive mechanism 19 may be formed with a parallel plate spring drive mechanism.

In the configuration described above, the measurement light emitted from the measurement light source 11 is converted by the measurement light collimator optical system 12 into collimated light, is then reflected off the return mirror M, enters the BS 13 and is divided into two light beams by transmission and reflection in the BS 13. One light beam separated is reflected off the moving mirror 16, the other light beam is reflected off the fixed mirror 15, they return along the original optical path to the BS 13 where they are superimposed and the superimposed light beam passes through the compensation plate 14 as the measurement interference light and is then applied to a sample (not shown).

Here, the light is applied to the sample while the moving mirror 16 is continuously being moved by the drive mechanism 19; when the difference of optical path lengths from the BS 13 to the mirrors (the moving mirror 16 and the fixed mirror 15) is an integral multiple of the wavelength, the intensity of the superimposed light is the highest. On the other hand, when the two optical path lengths are made to differ from each other by the movement of the moving mirror 16, the intensity of the superimposed light is changed. The light that has passed though the sample passes through an optical path separation mirror 24, which will be described later, is collected by the light collection optical system 17 and enters the measurement light detector 18 where the light is detected as an interferogram. In other words, in FIG. 1, the measurement light travels along the optical path indicated by dashed lines.

A part of the measurement light that enters the optical path separation mirror 24 is reflected by the optical characteristic of the optical path separation mirror 24, and enters a wavelength separation filter 41, which will be described later. This respect will be described later.

The computation portion 2 samples a detection signal (interferogram) from the measurement light detector 18, performs A/D conversion and Fourier transform and thereby generates a spectrum indicating the intensity of the light per number of waves. The spectrum described above is output (for example, displayed) by the output portion 3, and thus it is possible to analyze the characteristics (such as the material, the structure and the amount of components) of the sample based on the spectrum.

(Reference Optical System)

The reference optical system 20 will now be described. The reference optical system 20 overlaps the configuration of the measurement optical system 10 described above, and includes not only the BS 13, the compensation plate 14, the fixed mirror 15 and the moving mirror 16 described above but also the reference light source 21, a reference light collimator optical system 22, the optical path combination mirror 23, the optical path separation mirror 24 and a reference light detector 25.

The reference light source 21 is a light source that detects the position of the moving mirror 16 and that generates a timing signal for the sampling by the computation portion 2. In the present embodiment, the reference light source 21 includes, for example, a VCSEL (Vertical Cavity Surface Emitting Laser) later 21a, a lens system 21b and a single mode optical fiber 21c. The VCSEL later 21a is a vertical resonator surface light emitting laser; emitted light (laser light) is of linear polarization in which its polarization direction remains the same in terms of time. In the present embodiment, the VCSEL later 21a emits red light having a wavelength of 660 nm. In other words, the light emission wavelength of the VCSEL later 21a is a single color in a vertical signal mode. The vertical signal mode refers to a vertical mode waveform in which one light emission spectrum is present. The vertical mode refers to an electromagnetic mode in the optical axis direction (light propagation direction) of the laser light.

The whole of the reference light source 21 may be incorporated into the interferometer 1 or only a part of the reference light source 21 may be incorporated into the interferometer 1. Hence, as shown in the figure, the VCSEL later 21a and the lens system 21b may be arranged outside the interferometer 1. In this case, the reference light source 21 of the interferometer 1 can be said to be formed with an end surface on the light emission side of the light guide member (the single mode optical fiber 21c) that takes in and guides the light emitted from the light emission surface of the VCSEL later 21a. The reference light source 21 is configured as described above, and thus, for the optical system in the stage subsequent to the single mode optical fiber 21c, it is possible to reduce the effect of heat generated from the light emission surface of the VCSEL later 21a and to increase the flexibility of the arrangement of the light emission surface. The light emission surface of the VCSEL later 21a has, for example, a diameter of about 4 μm, which is more than the light emission surface (for example, a diameter of about 1 to 2 μm) of a general laser.

The reference light collimator optical system 22 is an optical system that converts the reference light (laser light) emitted from the reference light source 21 into collimated light and that guides it to the BS 13; the reference light collimator optical system 22 is formed with, for example, a collimator lens. On the light emission side of the reference light collimator optical system 22, an aperture A2 is arranged, and the diameter of the light beam of the collimated light is regulated. On the surface on the light emission side of the lens of the reference light collimator optical system 22, portions other than a portion from which the collimated light is emitted are painted black, with the result that the reference light collimator optical system 22 may be made to have the function of the aperture A2.

The optical path combination mirror 23 is a beam combiner that transmits the measurement light from the measurement light source 11, that reflects the reference light from the reference light source 21 and that thus overlays the optical paths of these types of light. In the present embodiment, the optical path combination mirror 23 is arranged such that the reference light obliquely enters the fixed mirror 15 and the moving mirror 16. Thus, the influence of the light returned from the fixed mirror 15 and the moving mirror 16 is prevented.

Specifically, since the optical path of the reference light is inclined with respect to the fixed mirror 15 and the moving mirror 16, even if the light reflected off the fixed mirror 15 passes through the BS 13 and is reflected off the optical path combination mirror 23 in the direction of the reference light collimator optical system 22 or even if the light reflected off the moving mirror 16 is reflected off the BS 13 to enter the optical path combination mirror 23 where the light is reflected in the direction of the reference light collimator optical system 22, these types of light enter the aperture A2 where they are interrupted, with the result that they are prevented from entering the reference light source 21. In this way, it is possible to prevent oscillation at the reference light source 21 from becoming unstable by the entrance of the retuned light. In FIG. 1, the optical paths of the light returned from the fixed mirror 15 and the moving mirror 16 are indicated by broken lines.

The optical path separation mirror 24 is a second beam splitter that separates the light subjected to interference and emitted by the BS 13 into two light beams, and that guides the individual light beams to the measurement light detector 18 and the reference light detector 25. In other words, the optical path separation mirror 24 is an optical element that is designed to branch (transmit or reflect) the light into the two light beams according to the wavelength of the entrance light, and is formed with an optical thin film (including a polarization separation film). In the present embodiment, the optical path separation mirror 24 has the property of reflecting a part of the entrance light in the sensitivity wavelength range of the reference light detector 25, which will be described later, and of transmitting the other parts (including the light in the sensitivity wavelength range of the measurement light detector 18).

The reference light detector 25 is a detector that detects the reference light emitted from the BS 13 and entering through the optical path separation mirror 24, and is formed with, for example, a four-division silicon photodiode (silicon photodiode) whose response speed is higher than that of, for example, a CCD. The wavelength range (sensitivity wavelength range) of the detection sensitivity of the reference light detector 25 is, for example, 320 to 1100 nm. In the optical path between the optical path separation mirror 24 and the reference light detector 25, an aperture A3 is arranged, and the aperture A3 regulates the diameter of the light beam of the reference light entering the reference light detector 25. When the reference light that has been subjected to interference by the BS 13 is especially indicated, the reference light is referred to as the reference interference light.

Figure 2:
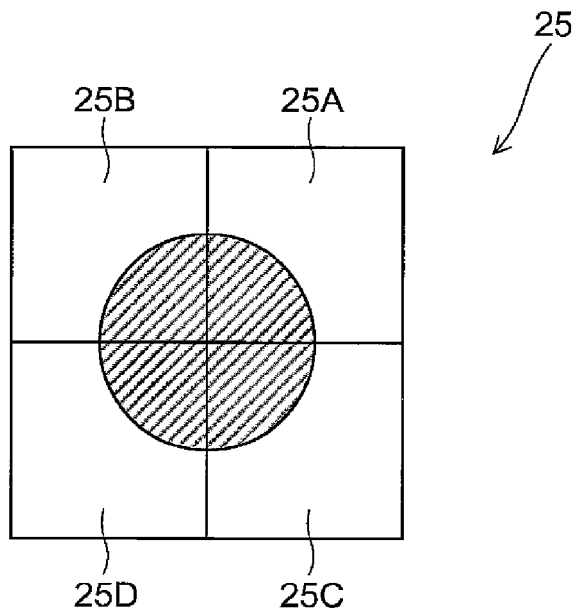
[FIG. 2] A plan view showing a schematic configuration of a reference light detector of an interferometer included in the spectrometer.

FIG. 2 is a plan view showing a schematic configuration of the reference light detector 25. As shown in the figure, the reference light detector 25 is formed with four light reception portions 25A to 25D, and the light reception portions 25A to 25D are arranged in two rows and two columns. The individual light reception portions of the reference light detector 25 are preferably arranged to align in two directions on the light reception surface of the reference interference light; when the reference light detector 25 has at least three light reception portions, it is possible to realize such an arrangement.

In the configuration described above, the reference light emitted from the reference light source 21 is converted by the reference light collimator optical system 22 into collimated light, is then reflected off the optical path combination mirror 23 and enters the BS 13 along the optical path overlaid on the optical path of the measurement light where the reference light is separated into two light beams. One light beam separated in the BS 13 is reflected off the moving mirror 16, the other light beam is reflected off the fixed mirror 15, they return along the original optical path to the BS 13 where they are superimposed and the superimposed light beam passes through the compensation plate 14 and enters the optical path separation mirror 24 where the light is reflected to enter the reference light detector 25. In other words, in FIG. 1, the reference light travels along the optical path indicated by solid lines.

In the reference light detector 25, the intensity of the reference interference light is changed between light and dark as a whole according to the position (optical path difference) of the moving mirror 16. Hence, based on the change of the intensity described above, it is possible to detect the position of the moving mirror 16, and it is also possible to measure the measurement light with the measurement light detector 18 while detecting the optical path difference of the two light beams reflected off the fixed mirror 15 and the moving mirror 16. The detection of the position of the moving mirror 16 based on the change of the intensity described above is performed by the signal processing portion 31 of the optical path correction portion 30, which will be described later. Based on the result of the detection by the reference light detector 25 (the change of the intensity of the reference interference light), the signal processing portion 31 generates a pulse signal indicating timing at which the output (interferogram) from the measurement light detector 18 is sampled, and the computation portion 2 samples the output from the measurement light detector 18 in synchronization with the sampling timing of the pulse signal, and converts it into digital data.

As in the present embodiment, the optical path of the measurement light is overlaid on the optical path of the reference light by the optical path combination mirror 23, and thus it is possible to decrease the effective areas of the reflective surfaces of the fixed mirror 15 and the moving mirror 16 as compared with the configuration in which these optical paths are arranged side by side, with the result that it is possible to reduce the size of the interferometer 1 and hence the size of the spectrometer. Since the effective areas of the reflective surfaces are reduced, and thus it is possible to sufficiently acquire the accuracy of each reflective surface, it is possible to maintain the satisfactory interference performance of the measurement light and the reference light.

Since the optical path of the measurement light is overlaid on the optical path of the reference light, and thus it is possible to reduce the effective area of each reflective surface, unlike the case where the size of each reflective surface is increased, it is not necessary to require the high accuracy of each reflective surface. Furthermore, it is possible to detect, in detail, with the reference light, optical information such as the optical path difference of the measurement light and an inclination between two optical paths, which will be described later, with the result that it is possible to perform the sampling and correct the inclination between the optical paths with high precision.

(Optical Path Correction Portion)

The optical path correction portion 30 will now be described. When the moving mirror 16 is driven by the drive mechanism 19, the translation of the moving mirror 16 is degraded to cause an error in the inclination described above. Thus, the interference between the light reflected off the fixed mirror 15 and the light reflected off the moving mirror 16 is reduced, and thus the interference intensity (contrast) of the measurement interference light is reduced. Hence, in the present embodiment, based on the result of detection of the reference interference light by the reference light detector 25, the optical path correction portion 30 corrects a relative inclination error (tilt error) between the optical path of the light reflected off the moving mirror 16 and the optical path of the light reflected off the fixed mirror 15, and thus the decrease in the interference intensity of the measurement interference light is avoided. This will be described in detail below.

Here, although in the present embodiment, the above-described arrangement of the optical path combination mirror 23 prevents the optical axis on the measurement light side from coinciding with the optical axis on the reference light side, since they are arranged substantially on the same axis, (1) an inclination error (also referred to as a first inclination error) between light that travels in the following order: the measurement light source 11, the BS 13, the moving mirror 16, the BS 13 and the measurement light detector 18 and light that travels in the following order: the measurement light source 11, the BS 13, the fixed mirror 15, the BS 13 and the measurement light detector 18 is substantially the same as (2) an inclination error (also referred to as a second inclination error) between light that travels in the following order: the reference light source 21, the BS 13, the moving mirror 16, the BS 13 and the reference light detector 25 and light that travels in the following order: the reference light source 21, the BS 13, the fixed mirror 15, the BS 13 and the reference light detector 25. Hence, the optical path correction portion 30 corrects the second inclination error based on the light reception signal of the reference interference light from the reference light detector 25, and thereby can correct the first inclination error.

Specifically, the optical path correction portion 30 described above includes the signal processing portion 31, an adjustment mechanism 32 and a control portion 33. The control portion 33 is formed with, for example, a CPU, and controls the adjustment mechanism 32 based on the result of detection by the signal processing portion 31.

Figure 3:
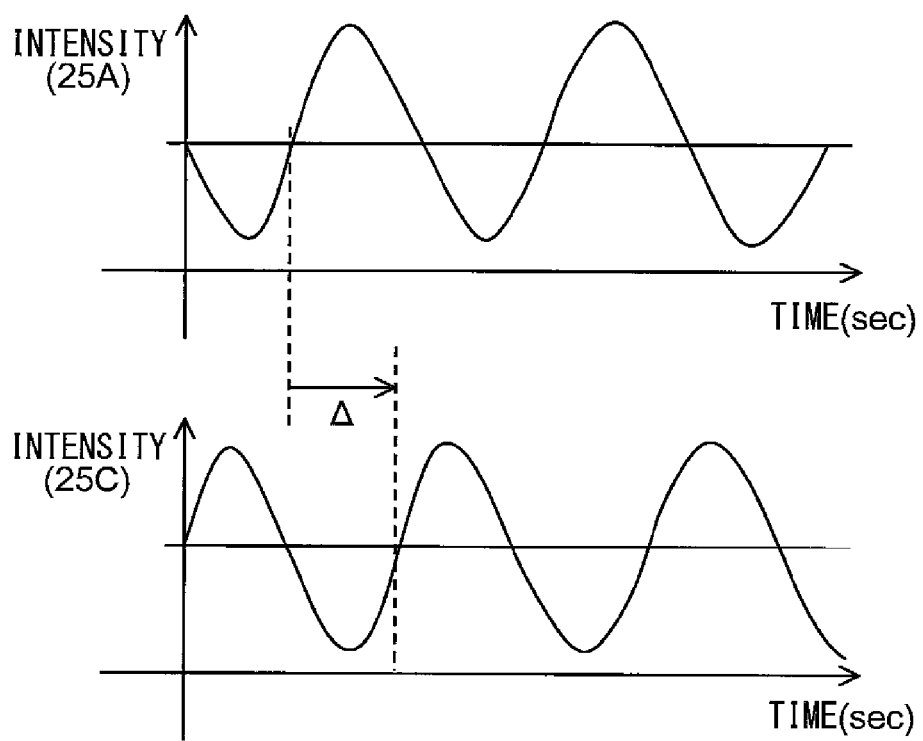
[FIG. 3] An illustrative diagram showing two phase signals output from the reference light detector.

The signal processing portion 31 is an inclination detection portion that detects an inclination error based on the intensity of the reference interference light detected by the reference light detector 25. For example, FIG. 3 shows a phase signal (signal indicating the intensity of light, of the entire reference interference light, received by the light reception portion 25A) output from the light reception portion 25A of the reference light detector 25 and a phase signal (signal indicating the intensity of light, of the entire reference interference light, received by the light reception portion 25C) output from the light reception portion 25C. The intensity of the vertical axis of FIG. 3 indicates a relative value. In this example, by an angle corresponding to the phase difference Δ of these two signals, an inclination error is produced in a direction (hereinafter also referred to as an A-C direction) corresponding to the direction in which the light reception portions 25A and 25C are aligned.

As described above, the signal processing portion 31 can detect the inclination error in the A-C direction based on the phase difference of the signals output from the two light reception portions 25A and 25C. In the same manner, the signal processing portion 31 also can detect an inclination error in a direction (hereinafter also referred to as an A-B direction) corresponding to the direction in which the light reception portions 25A and 25B are aligned based on the phase difference of the signals output from the two light reception portions 25A and 25B. Hence, the signal processing portion 31 can detect the inclination errors in the two directions based on the phase difference of the signals output from three light reception portions 25A, 25B and 25C.

The adjustment mechanism 32 adjusts the inclination of the fixed mirror 15, and thereby inclines one of the two optical paths to correct the inclination error. In the present embodiment, as shown in FIG. 1, the adjustment mechanism 32 includes a plurality of (at least three) piezoelectric elements 32a whose ends are coupled to a back surface (surface on the opposite side to the reflective surface) of the fixed mirror 15 to expand and contract in the optical axis direction and a drive portion 32b that applies a voltage to the piezoelectric elements 32a to make the piezoelectric elements 32a expand and contract. Based on the result of the detection by the signal processing portion 31, the control portion 33 controls the voltage applied to the piezoelectric elements 32a to make the individual piezoelectric elements 32a expand and contract in the optical axis direction, with the result that it is possible to change the inclination (the optical path of the light reflected off the fixed mirror 15) of the fixed mirror 15 and thereby correct the inclination error.

Feedback control in which the detection of the inclination error by the signal processing portion 31 and the correction of the optical path of the light reflected off the fixed mirror 15 by the adjustment mechanism 32 described above is performed repeatedly, and thus it is possible to finally bring the inclination error to zero as much as possible.

Although not shown, the adjustment mechanism 32 of the optical path correction portion 30 may adjust the inclination of the moving mirror 16 to incline one of the two optical paths and thereby correct the inclination error. In this case, the ends of the individual piezoelectric elements 32a are coupled to the back surface of the moving mirror 16, and the piezoelectric elements 32a are made to expand and contract by the drive portion 32b, and thus it is possible to change the inclination of the moving mirror 16 and thereby correct the optical path of the light reflected off the moving mirror 16. Here, the drive mechanism 19 of the moving mirror 16 is preferably coupled to the back surface (the opposite side to the individual piezoelectric elements 32a) of the drive portion 32b.

The signal processing portion 31 and the control portion 33 described above may be provided outside the interferometer 1.

(About Wavelength Separation Filter)

In order to highly accurately detect the reference light with the reference light detector 25, the interferometer 1 of the present embodiment further includes the wavelength separation filter 41. The wavelength separation filter 41 will be described in detail below.

The wavelength separation filter 41 is an optical filter (bandpass filter) that cuts (reflects or absorbs) light in a part of the sensitivity wavelength range of the reference light detector 25, of (the light included in the wavelength range of) the measurement light; the wavelength separation filter 41 is formed with, for example, a dielectric multilayer film. In the present embodiment, the wavelength separation filter 41 is arranged in the optical path between the optical path separation mirror 24 and the reference light detector 25.

Figure 4:
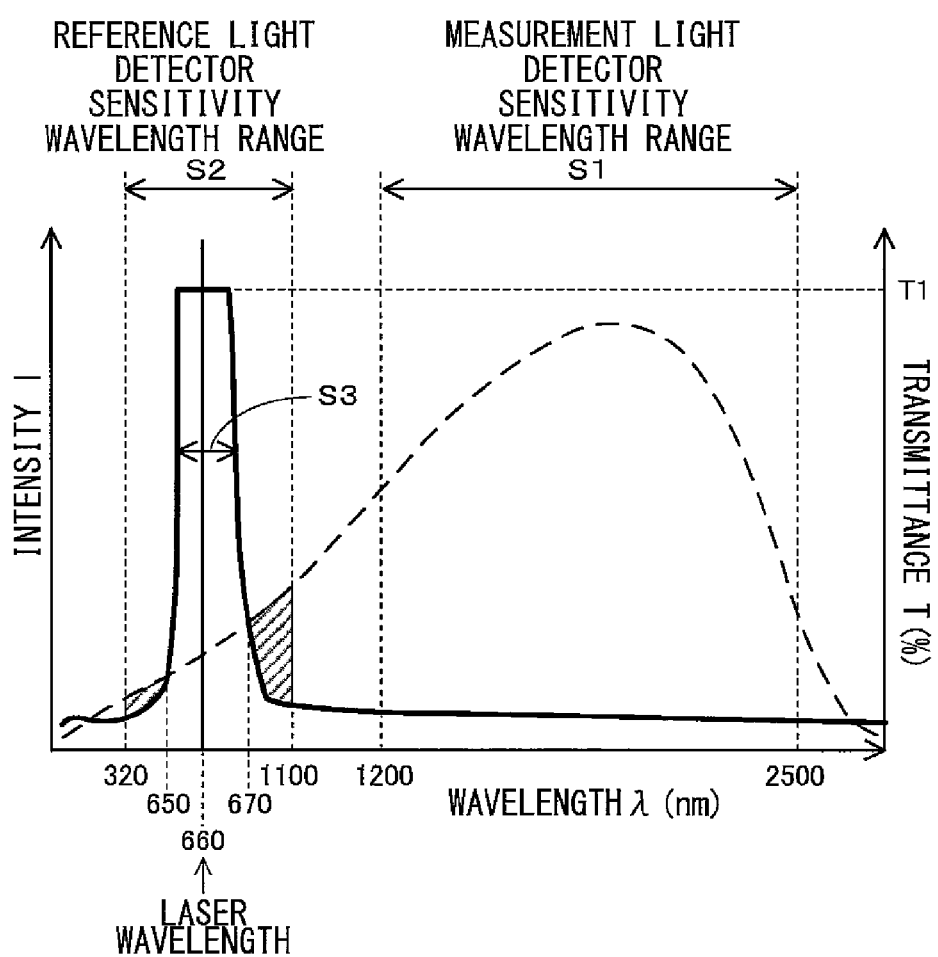
[FIG. 4] A graph showing the optical characteristic of a wavelength separation filter of the interferometer.

Here, FIG. 4 is a graph showing the optical characteristic (the relationship between a wavelength and a transmittance) of the wavelength separation filter 41 of the present embodiment (see a thick solid line). The figure also shows the intensity I of the measurement light (see a broken-line graph), the intensity of laser light as the reference light (see a thin sold line), the sensitivity wavelength range S1 of the measurement light detector 18 and the sensitivity wavelength range S2 of the reference light detector 25. The sensitivity wavelength range S1 is, for example, 1200 to 2500 nm, as described above; the sensitivity wavelength range S2 is, for example, 320 to 1100 nm, as described above. In FIG. 4, the intensity I in the vertical axis indicates a relative value with respect to the maximum intensity of the laser, and the scale of the wavelength in the horizontal axis does not have regular intervals.

In the present embodiment, it is found from FIG. 4 that the wavelength (660 nm) of the laser light serving as the reference light is shorter than the shortest wavelength (1200 nm) in the sensitivity wavelength range S1 of the measurement light detector 18, and that the measurement light emitted from the measurement light source 11 includes light in the sensitivity wavelength range S1 of the measurement light detector 18 and light in the sensitivity wavelength range S2 of the reference light detector 25.

The wavelength separation filter 41 described above has the optical property of transmitting the light in a wavelength range S3 including the wavelength of the laser light, within the sensitivity wavelength range S2 of the reference light detector 25, of the light entering through the optical path separation mirror 24. Specifically, the wavelength range S3 is a wavelength range of, for example, 660±10 nm, and is significantly narrower than the sensitivity wavelength range S2 of the reference light detector 25. The transmittance T1 of the wavelength separation filter 41 in the wavelength range S3 is, for example, 90% or more.

Due to the optical characteristic of the optical path separation mirror 24 described above, the light in the sensitivity wavelength range S2 of the reference light detector 25, of the light (the measurement light and the reference light) entering the optical path separation mirror 24 from the BS 13, is reflected off the optical path separation mirror 24 to travel toward the reference light detector 25. Hence, when the measurement light includes the light in the sensitivity wavelength range S2, since the light described above also enters the reference light detector 25, the light described above becomes noise at the time of detection of the reference light, with the result that it is impossible to highly accurately detect the reference light with the reference light detector 25.

However, the wavelength separation filter 41 is arranged, and thus, even if the measurement light originally includes the light in the sensitivity wavelength range S2 of the reference light detector 25, it is possible to prevent the light from becoming noise to enter the reference light detector 25, with the result that it is possible to prevent the accuracy of the detection of the reference light from being lowered.

In other words, in FIG. 4, light (portion indicated by oblique hatching) other than the wavelength range S3 included in the sensitivity wavelength range S2 of the reference light detector 25, of (the light included in the wavelength range of) the measurement light, is cut by the wavelength separation filter 41, and thus it is possible to reduce noise light other than the reference light entering the reference light detector 25. Although in the figure, for convenience, the wavelength range S3 is shown to be enlarged by exaggeration, the range of 660±10 nm is significantly narrow, and a large part of the light (noise light) in the wavelength range S2, of the measurement light, is cut by the wavelength separation filter 41. Consequently, it is possible to reduce the ratio of the amount of the measurement light to the amount of the reference light entering the reference light detector 25 from 20% (without the wavelength separation filter) to less than 5% (with the wavelength separation filter). In other words, although the light of 660±10 nm, of the measurement light, is not cut by the wavelength separation filter 41 and enters the reference light detector 25, the amount of such light is significantly low.

Hence, even if the measurement light emitted from the measurement light source 11 includes light in the sensitivity wavelength range S2 of the reference light detector 25, the wavelength separation filter 41 is provided, and thus it is possible to reduce the light in the sensitivity wavelength range S2 included in the measurement light, with the result that it is possible to highly accurately detect the reference light with the reference light detector 25. Consequently, based on the result of the detection by the reference light detector 25, it is possible to measure the measurement light while detecting the optical path difference of the two light beams with high precision.

In particular, although in the present embodiment, the VCSEL, which is small-sized and inexpensive and has high wavelength stability is used as the reference light source 21, the VCSEL has difficulty in increasing a light emission output due to its structure, with the result that, when it is applied to an accurate measurement, noise light (stray light) other than laser light entering the detector is problematic. However, since as in the present embodiment, the wavelength separation filter 41 is used, and thus it is possible to remove the noise light (part of the measurement light) entering the reference light detector 25, especially when a light source such as the VCSEL producing a low output is used as the reference light source 21, it is effective to provide the wavelength separation filter 41.

In recent years, semiconductor lasers have been widely used, a technology for stabilizing the light emission wavelength of the semiconductor laser has been advanced and a DBR (Distributed Bragg Reflector Laser) laser and a DFB (distributed feedback) laser that stabilize the light emission wavelength by combination with the semiconductor laser have been developed. The DBR later and the DFB later described above can be used as the reference light source 21 instead of the VCSEL described above; even in this case, it is possible to obtain the same effects as in the present embodiment.

Since the reference light detector 25 can detect the reference light with high precision, the signal processing portion 31 described above can generate the appropriate sampling signal based on the result of the detection by the reference light detector 25. Consequently, the computation portion 2 samples the output from the measurement light detector 18 in synchronization with the sampling signal to generate a spectrum, and thus it is possible to highly accurately perform a spectroscopic analysis based on the above spectrum.

Furthermore, since the reference light detector 25 can detect the reference light with high precision, the optical path correction portion 30 described above can correct the inclination between the two optical paths with high precision based on the result of the detection by the reference light detector 25. In this way, it is possible to obtain high-contrast measurement interference light. By sampling the measurement interference light based on the result of the detection by the reference light detector 25, it is possible to stably measure a measurement interference signal.

Since the wavelength separation filter 41 is arranged in the optical path between the optical path separation mirror 24 and the reference light detector 25, even when unnecessary light (light included in the sensitivity wavelength range S2 of the reference light detector 25, of the measurement light) that is noise is included in light entering the reference light detector 25 from the optical path separation mirror 24, the unnecessary light is cut by the wavelength separation filter 41 immediately before entering the reference light detector 25. Thus, it is possible to reliably detect the reference light with the reference light detector 25 with high precision.

The wavelength separation filter 41 transmits the light (the reference light and the measurement light) in the wavelength range S3 including the wavelength of the laser light, of the light entering from the optical path separation mirror 24. Hence, the laser light serving as the reference light is not cut by the wavelength separation filter 41 and enters the reference light detector 25 but the other light is cut by the wavelength separation filter 41. Thus, it is possible to cut the noise light included in the measurement light without preventing the entrance of the reference light into the reference light detector 25 and to detect the reference light with high precision.

The sensitivity wavelength range of the silicon photodiode of the reference light detector 25 is 1100 nm or less; in the present embodiment, the wavelength of the laser light serving as the reference light is 660 nm that is equal to or less than 1100 nm, with the result that it is possible to reliably detect the laser light with the silicon photodiode.

Although in the present embodiment, the wavelength separation filter 41 is used as an optical element separate from the optical path separation mirror 24, the optical path separation mirror 24 may be made to have the optical characteristic of the wavelength separation filter 41. In other words, the wavelength separation filter 41 and the optical path separation mirror 24 may be formed integrally. One optical surface is made to have a plurality of functions, and thus it is possible to reduce the number of surfaces through which light passes to reduce a loss of reflection by the optical surfaces and a loss of absorption when light passes through optical components, with the result that it is possible to increase the efficiency of utilization of light.

<Embodiment 2>

Another embodiment of the present invention will be described below with reference to drawings.

Figure 5:
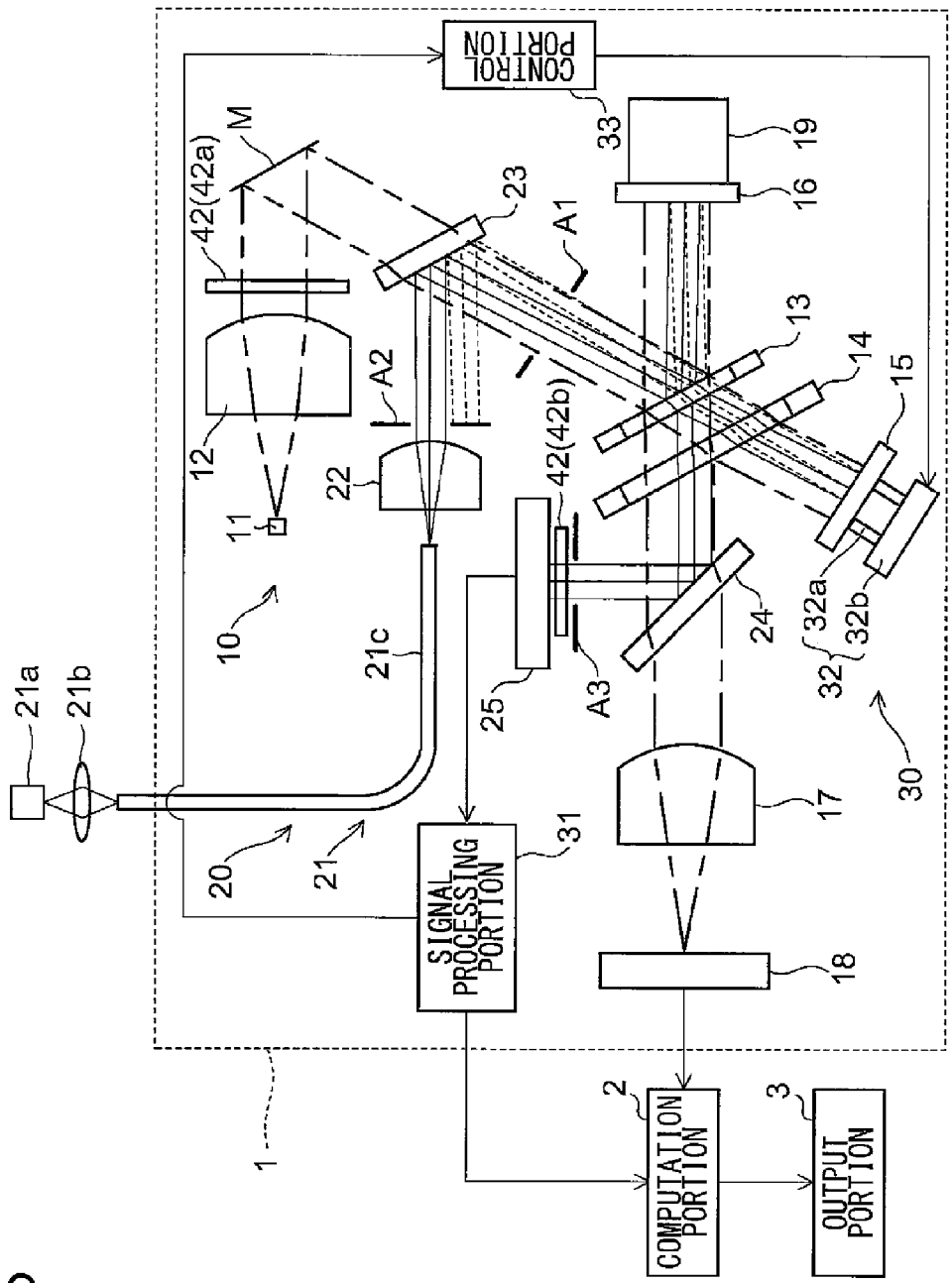
[FIG. 5] An illustrative diagram schematically showing a schematic configuration of a spectrometer according to another embodiment of the present invention.

FIG. 5 is an illustrative diagram schematically showing a schematic configuration of a spectrometer according to the present embodiment. In this spectrometer, instead of the wavelength separation filter 41 configured in the embodiment 1, a wavelength separation filter 42 is used. The wavelength separation filter 42 is formed with a first optical filter 42a and a second optical filter 42b.

Figure 6:
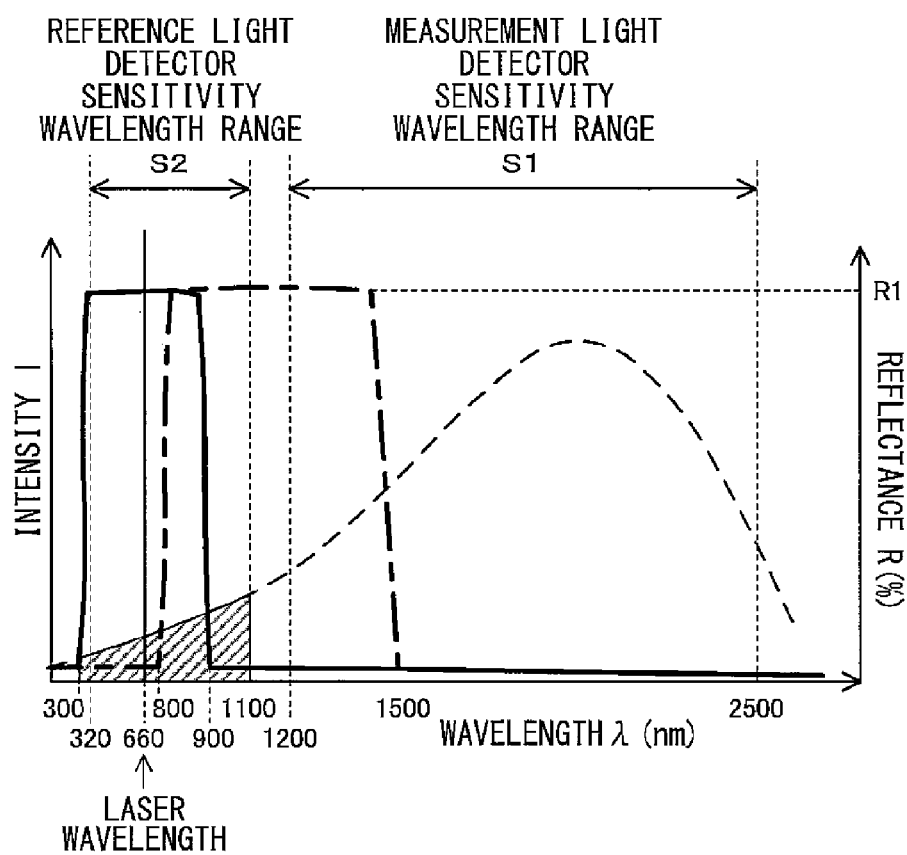
[FIG. 6] A graph showing the optical characteristic of a wavelength separation filter of the interferometer included in the spectrometer.

FIG. 6 is a graph showing the optical characteristic (the relationship between a wavelength and a reflectance) of the wavelength separation filter 42 according to the present embodiment. In FIG. 6, the optical characteristic of the first optical filter 42a is indicated by a thick solid line, and the optical characteristic of the second optical filter 42b is indicated by a thick dotted line.

The first optical filter 42a is a bandpass filter that is arranged in the optical path between the measurement light source 11 and the optical path combination mirror 23, and that has the optical property of cutting light in a part of the sensitivity wavelength range S2 of the reference light detector 25 including the wavelength of the laser light serving as the reference light, of (the light included in the wavelength range of) the measurement light. Specifically, the first optical filter 42a reflects, of (the light included in the wavelength range of) the measurement light, light from a wavelength (for example, 300 nm) shorter than the shortest wavelength (for example, 320 nm) in the sensitivity wavelength range S2 of the reference light detector 25 to a wavelength (for example, 900 nm) longer than the wavelength (for example, 660 nm) of the laser light but shorter than the longest wavelength (for example, 1100 nm) in the sensitivity wavelength range S2 of the reference light detector 25. The first optical filter 42a may have the property of absorbing the measurement light in the wavelength range described above.

The second optical filter 42b is a bandpass filter that is arranged in the optical path between the optical path separation mirror 24 and the reference light detector 25, and that has the optical property of cutting the remaining light in the sensitivity wavelength range S2 of the reference light detector 25, of (the light included in the wavelength range of) the measurement light. Specifically, the second optical filter 42b cuts, of (the light included in the wavelength range of) the measurement light, light from a wavelength (for example, 800 nm) longer than the wavelength (for example, 660 nm) of the laser light but shorter than the longest wavelength (for example, 900 nm) in the wavelength range cut by the first optical filter 42 to a wavelength (for example, 1500 nm) longer than the longest wavelength (for example, 1100 nm) in the sensitivity wavelength range S2 of the reference light detector 25. The second optical filter 42b may have the property of absorbing the measurement light in the wavelength range described above.

In the first optical filter 42a and the second optical filter 42b, a reflectance R1 in the wavelength range where the measurement light is cut is, for example, 90% or more.

In the present embodiment, in the optical path from the measurement light source 11 through the optical path separation mirror 24 to the reference light detector 25, the first optical filter 42a and the second optical filter 42b are arranged, and thus a part of the light in the sensitivity wavelength range S2 of the reference light detector 25 included in the measurement light is cut by the first optical filter 42a, and the remaining light in the sensitivity wavelength range S2 included in the measurement light is reflected off the optical path separation mirror 24 in the direction of the reference light detector 25, and is then cut by the second optical filter 42b. Hence, the wavelength range of the measurement light cut by the first optical filter 42a and the second optical filter 42b is a portion indicated by oblique hatching in FIG. 6.

Since in the optical path separation mirror 24, only light in the sensitivity wavelength range S2 of the reference light detector 25, of the entrance light, is reflected, and light of wavelengths of 1100 nm or more passes through the optical path separation mirror 24, in FIG. 6, the wavelength range of the measurement light cut by the second optical filter 42b does not include the light of wavelengths of 1100 nm or more (on which the oblique hatching is not performed). Even if the reflectance of the optical path separation mirror 24 is not completely 100%, and thus the light of wavelengths of 1100 nm or more is slightly reflected off the optical path separation mirror 24 to travel in the direction of the reference light detector 25, light of wavelengths of 1500 nm or less is cut by the second optical filter 42b.

As described above, the wavelength separation filter 42 is formed with the first optical filter 42a and the second optical filter 42b, and thus the light in the sensitivity wavelength range S2 of the reference light detector 25 that is noise of the measurement light is cut, with the result that the reference light detector 25 can detect the reference light with high precision.

The wavelength separation filter 42 is formed with two filters, that is, the first optical filter 42a and the second optical filter 42b; the first optical filter 42a is arranged in the optical path of the measurement light, and thus it is possible to cut, with the first optical filter 42a, the measurement light that cannot be cut in the embodiment 1, that is, the light of the measurement light having the same wavelength as the laser light. In this way, it is possible to reliably reduce the entrance of the measurement light having the same wavelength as the laser light, and to reliably increase the accuracy of the detection of the reference light.

As described above, the reflection wavelength ranges of the first optical filter 42a and the second optical filter 42b are set, and thus it is possible to cut all the light in the sensitivity wavelength range S2 of the reference light detector 25, of the measurement light, and to reliably detect, with the reference light detector 25, the reference light with high precision.

The optical path separation mirror 24 may be made to have the optical characteristic of the second optical filter 42b, and they may be formed integrally. In this case, it is possible to reduce the number of surfaces though which light passes, and to prevent the decrease in the efficiency of utilization of light caused by a loss of reflection on the optical surface.

<Embodiment 3>

Another embodiment of the present invention will be described below with reference to drawings.

Figure 7:
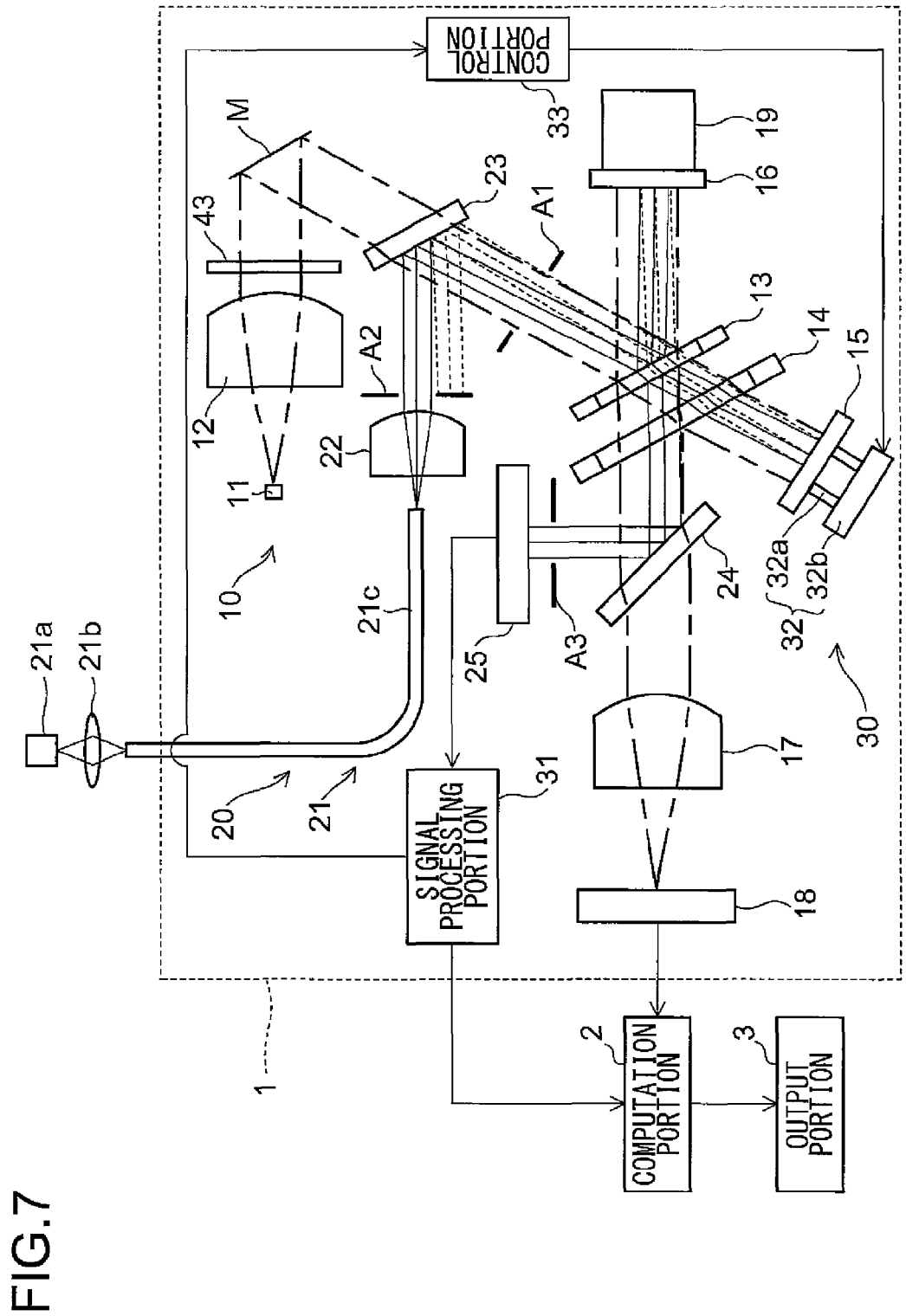
[FIG. 7] An illustrative diagram schematically showing a schematic configuration of a spectrometer according to yet another embodiment of the present invention.
Figure 8:
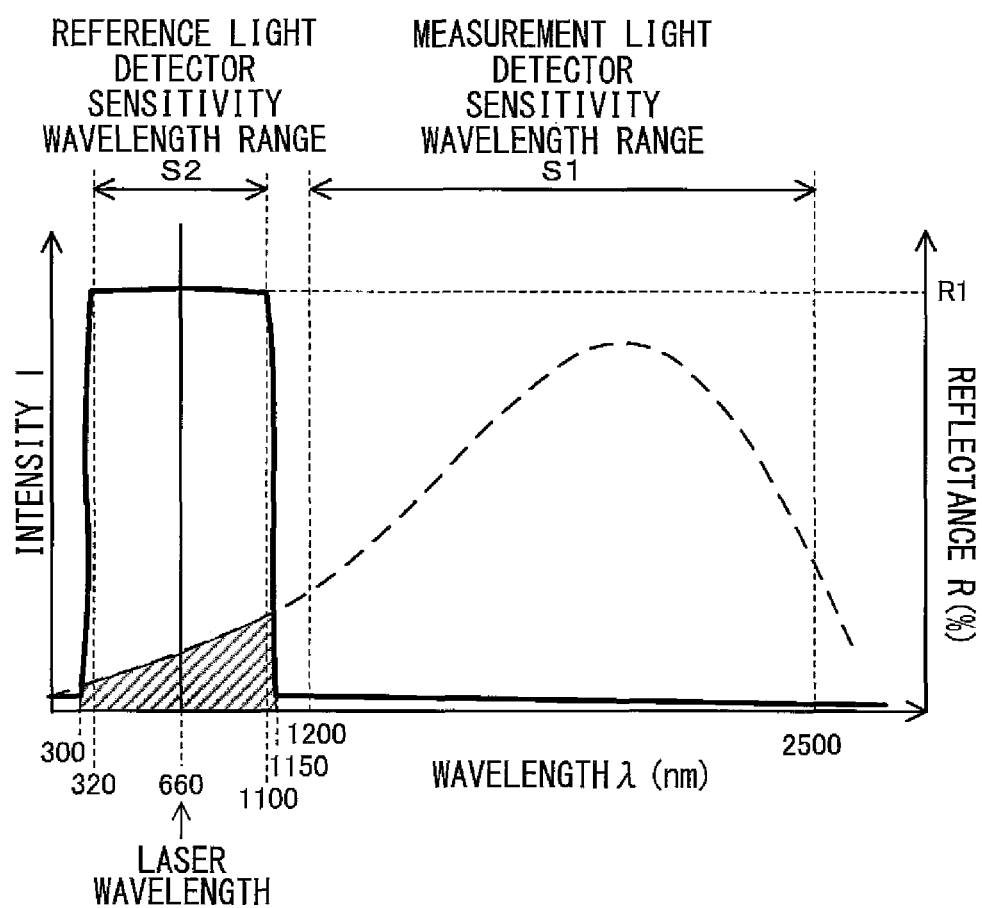
[FIG. 8] A graph showing the optical characteristic of a wavelength separation filter of the interferometer included in the spectrometer.

FIG. 7 is an illustrative diagram schematically showing a schematic configuration of a spectrometer according to the present embodiment. In this spectrometer, instead of the wavelength separation filter 41 configured in the embodiment 1, a wavelength separation filter 43 is used. FIG. 8 is a graph showing the optical characteristic (the relationship between a wavelength and a reflectance) of the wavelength separation filter 43 according to the present embodiment.

The wavelength separation filter 43 is arranged in the optical path between the measurement light source 11 and the optical path combination mirror 23, and has the optical property of cutting light in at least a part of the sensitivity wavelength range S2 of the reference light detector 25, of (the light included in the wavelength range of) the measurement light output from the measurement light source 11. Specifically, the wavelength separation filter 43 reflects, of (the light included in the wavelength range of) the measurement light, light from a wavelength (for example, 300 nm) shorter than the shortest wavelength (for example, 320 nm) in the sensitivity wavelength range S2 of the reference light detector 25 to a wavelength (for example, 1150 nm) longer than the longest wavelength (for example, 1100 nm) in the sensitivity wavelength range S2 but shorter than the shortest wavelength (for example, 1200 nm) in the sensitivity wavelength range S1 of the measurement light detector 18.

The wavelength separation filter 43 may have the property of absorbing the measurement light in the wavelength range described above. In the wavelength separation filter 43, the reflectance R1 in the wavelength range where the measurement light is cut is, for example, 90% or more.

In the present embodiment, since the wavelength separation filter 43 cuts the light in the sensitivity wavelength range S2 of the reference light detector 25, from the measurement light, it is possible to reduce the entrance of the measurement light that is noise, through the optical path separation mirror 24 into the reference light detector 25, and to detect, with the reference light detector 25, the reference light with high precision.

The wavelength separation filter 43 may have the property of cutting light in a part of the sensitivity wavelength range S2 of the reference light detector 25, from the reference light detector 25. Even in this case, it is possible to likewise reduce the entrance of the measurement light that is noise, through the optical path separation mirror 24 into the reference light detector 25, and to detect the reference light with high precision.

As in the present embodiment, the reflection wavelength range (for example, 300 to 1150 nm) of the wavelength separation filter 43 is set, and thus the wavelength range (range indicated by oblique hatching) where the measurement light is cut complexly includes the light in the sensitivity wavelength range S2 of the reference light detector 25, and most of light in the sensitivity wavelength range S2 of the reference light detector 25 is cut from the measurement light. In this way, it is possible to reliably detect, with the reference light detector 25, the reference light with high precision. Moreover, since the light in the sensitivity wavelength range S1 of the measurement light detector 18, of the measurement light, is not cut, the detection of the measurement light by the measurement light detector 18 is not prevented.

As described above, in the embodiment 1, the wavelength range where the measurement light is cut by the wavelength separation filter 41 is the part of the sensitivity wavelength range S2 (320 to 1100 nm) of the reference light detector 25, that is, 320 to 650 nm and 670 to 1100 nm (see FIG. 4). In the embodiment 2, the wavelength range where the measurement light is cut by the wavelength separation filter 42 (the first optical filter 42a and the second optical filter 42b) is 300 to 1100 nm including the sensitivity wavelength range S2 of the reference light detector 25 (see FIG. 6). In the embodiment 3, the wavelength range where the measurement light is cut by the wavelength separation filter 43 is 300 to 1150 nm including the sensitivity wavelength range S2 of the reference light detector 25 (see FIG. 8). Hence, when the interferometer 1 described above includes the wavelength separation filter that cuts light in at least a part of the sensitivity wavelength range S2 of the reference light detector 25, of (the light included in the wavelength range of) the measurement light, it is possible to reduce noise light entering the reference light detector 25, and to prevent the decrease in the accuracy of the detection of the reference light. Since in the embodiments 2 and 3, the wavelength range where the measurement light is cut includes the wavelength range where the measurement light is cut in the embodiment 1, the interferometer 1 described above preferably includes only the wavelength separation filter that cuts at least light in a range other than the wavelength range S3 narrower than the wavelength range S2 including the wavelength of the laser light, within the sensitivity wavelength range S2 of the reference light detector 25, of (the light included in the wavelength range of) the measurement light.

Although in each of the embodiments described above, the fixed mirror 15 and the moving mirror 16 are formed with separate members arranged in separate positions, for example, preferably, a reflective surface is formed on each of the front and back of one plate-shaped member, the plate-shaped member is moved in the axis direction of the entrance light to produce an optical path difference between the optical path of light reflected off one reflective surface and the optical path of light reflected off the other reflective surface and thus interference is produced. In this case, the one reflective surface functions as a first reflective member (reference reflective member), and the other reflective surface functions as a second reflective member (relative movement reflective member).

The interferometer described above can also be expressed as follows, and thus the following effects are produced.

Specifically, the interferometer described above includes: a measurement light source that emits measurement light; a measurement light detector that detects the measurement light; a reference light source that emits, as reference light, laser light whose wavelength is shorter than a sensitivity wavelength range of the measurement light detector; a reference light detector that detects the reference light; a beam combiner that overlays an optical path of the measurement light and an optical path of the reference light; a first beam splitter that separates, into two light beams, each of the measurement light and the reference light entering through the beam combiner; a first reflective member that is arranged on an optical path of one of the two light beams separated by the first beam splitter and that reflects and makes each of the measurement light and the reference light enter the first beam splitter again; a second reflective member that is arranged on an optical path of the other of the two light beams separated by the first beam splitter and that reflects and makes each of the measurement light and the reference light enter the first beam splitter again; and a second beam splitter that separates, into two light beams, light which is subjected to interference in the first beam splitter and emitted by the first beam splitter, and that guides the light beams to the measurement light detector and the reference light detector, respectively, where, based on a result of detection by the reference light detector when the first reflective member and the second reflective member are relatively moved, the interferometer measures the measurement light while detecting an optical path difference of the two light beams separated by the first beam splitter, the measurement light emitted from the measurement light source includes light in a sensitivity wavelength range of the measurement light detector and light in a sensitivity wavelength range of the reference light detector and the interferometer further includes a wavelength separation filter that cuts at least light in a range that is within the sensitivity wavelength range of the reference light detector and that is separate from the wavelength range including the wavelength of the laser light, of light included in the wavelength range of the measurement light.

Moreover, the interferometer described above includes: a measurement light source that emits measurement light; a measurement light detector that detects the measurement light; a reference light source that emits, as reference light, laser light whose wavelength is shorter than a sensitivity wavelength range of the measurement light detector; a reference light detector that detects the reference light; a beam combiner that overlays an optical path of the measurement light and an optical path of the reference light; a first beam splitter that separates, into two light beams, each of the measurement light and the reference light entering through the beam combiner; a first reflective member and a second reflective member that reflect two light beams into which the measurement light and the reference light are individually separated by the first beam splitter, that make them enter the first beam splitter again, that make them interfere with each other and that are relatively moved to produce an optical path difference of the two light beams; and a second beam splitter that separates, into two light beams, light which is subjected to interference in the first beam splitter and emitted by the first beam splitter, and that guides the light beams to the measurement light detector and the reference light detector, respectively, where, based on a result of detection by the reference light detector when the first reflective member and the second reflective member are relatively moved, the interferometer measures the measurement light while detecting an optical path difference of the two light beams separated by the first beam splitter, the measurement light emitted from the measurement light source includes light in a sensitivity wavelength range of the measurement light detector and light in a sensitivity wavelength range of the reference light detector and the interferometer further includes a wavelength separation filter that cuts at least light in a range that is within the sensitivity wavelength range of the reference light detector and that is separate from the wavelength range including the wavelength of the laser light, of the measurement light.

In the configuration described above, the measurement light emitted from the measurement light source and the reference light (laser light) emitted from the reference light source enter the first beam splitter with their optical paths overlaid by the beam combiner, and are respectively separated into two light beams. The separated two light beams are reflected off the first and second reflective members, and thereafter enter the first beam splitter again, where they interfere with each other. Here, since the first and second reflective members are relatively moved to produce an optical path difference of the two light beams, the intensity of the interference light is changed according to the wavelength. The interference light emitted from the first beam splitter is separated by the second beam splitter into two light beams, and they are guided to the measurement light detector and the reference light detector. In this way, it is possible to measure the measurement light while detecting the optical path difference of the two light beams based on the result of the detection of the reference light by the reference light detector.

As described above, the optical path of the measurement light is overlaid on the optical path of the reference light by the beam combiner, and thus it is possible to decrease the effective areas of the reflective surfaces of the first and second reflective members as compared with the configuration in which these optical paths are arranged side by side, with the result that it is possible to reduce the size of the interferometer, and it is also possible to maintain satisfactory interference performance by decreasing the effective areas of the reflective surfaces to sufficiently acquire the accuracy of the reflective surfaces.

Even if the measurement light includes light in the sensitivity wavelength range of the reference light detector, since the wavelength separation filter cuts (reflects or absorbs) light in a range that is within the sensitivity wavelength range of the reference light detector and that is separate from the wavelength range including the wavelength of the laser light, the entrance of unnecessary light included in the measurement light into the reference light detector is prevented from reducing the accuracy of the detection of the reference light. Hence, even when an output (intensity) of the reference light emitted from the reference light source is small, it is possible to detect the reference light with high precision and measure the measurement light while detecting the optical path difference of the two light beams with high precision.

In the interferometer described above, the wavelength separation filter may be arranged in the optical path between the second beam splitter and the reference light detector.

Even when the light entering the reference light detector from the second beam splitter includes the measurement light, the light of the measurement light that is included in the sensitivity wavelength range of the reference light detector is cut by the wavelength separation filter immediately before entering the reference light detector. In this way, it is possible to reliably detect, with the reference light detector, the reference light with high precision.

In the interferometer described above, the wavelength separation filter transmits light in the wavelength range including the wavelength of the laser light, within the sensitivity wavelength range of the reference light detector, of the light entering from the second beam splitter.

Of the light entering the wavelength separation filter from the second beam splitter, the light (the reference light and the measurement light) in the wavelength range including the wavelength of the laser light passes through the wavelength separation filter, and the measurement light other than the wavelength range is cut by the wavelength separation filter. Thus, it is possible to cut unnecessary light included in the measurement light with the wavelength separation filter without preventing the entrance of the reference light into the reference light detector.

Preferably, in the interferometer described above, the wavelength separation filter is formed with: a first optical filter that is arranged in an optical path between the measurement light source and the beam combiner; and a second optical filter that is arranged in an optical path between the second beam splitter and the reference light detector, the first optical filter cuts light in a part of the sensitivity wavelength range of the reference light detector including the wavelength of the laser light, of (the light included in the wavelength range of) the measurement light and the second optical filter cuts remaining light in the sensitivity wavelength range of the reference light detector, of (the light included in the wavelength range of) the measurement light.

The first and second optical filters cut all the light in the sensitivity wavelength range of the reference light detector, from the measurement light. Thus, it is possible to detect, with the reference light detector, the reference light with high precision. In particular, two types of optical filters are used, and thus one optical filter (first optical filter) can cut light including the wavelength of the laser light, of the measurement light. Hence, with an optical system subsequent to the first optical filter, it is possible to reliably reduce the inclusion of the measurement light having the same wavelength as the laser light into the light entering the reference light detector from the second beam splitter, with the result that it is possible to reliably increase the accuracy of the detection of the reference light by the reference light detector.

Preferably, in the interferometer described above, the first optical filter cuts, of (the light included in the wavelength range of) the measurement light, light from a wavelength shorter than a shortest wavelength in the sensitivity wavelength range of the reference light detector to a wavelength longer than the wavelength of the laser light but shorter than a longest wavelength in the sensitivity wavelength range of the reference light detector, and the second optical filter cuts, of (the light included in the wavelength range of) the measurement light, light from a wavelength longer than the wavelength of the laser light but shorter than the longest wavelength in the wavelength range cut by the first optical filter to a wavelength longer than the longest wavelength in the sensitivity wavelength range of the reference light detector.

With the first and second optical filters, it is possible to reliably cut the light in the sensitivity wavelength range of the reference light detector from the measurement light, with the result that it is possible to reliably detect, with the reference light detector with high precision.

Preferably, in the interferometer described above, the wavelength separation filter is arranged in an optical path between the measurement light source and the beam combiner, and cuts light in at least a part of the sensitivity wavelength range of the reference light detector, of (the light included in the wavelength range of) the measurement light.

The wavelength separation filter cuts light in at least a part of the sensitivity wavelength range of the reference light detector from the measurement light, and thus it is possible to reduce the entrance of the unnecessary light that is included in the measurement light and that is noise, into the reference light detector, with the result that it is possible to detect the reference light with high precision.

Preferably, in the interferometer described above, the wavelength separation filter cuts, of (the light included in the wavelength range of) the measurement light, light from a wavelength shorter than a shortest wavelength in the sensitivity wavelength range of the reference light detector to a wavelength longer than a longest wavelength in the sensitivity wavelength range but shorter than a shortest wavelength in the sensitivity wavelength range of the measurement light detector.

Since the measurement light (unnecessary light) that is noise over the entire sensitivity wavelength range does not enter the reference light detector, it is possible to reliably detect, with the reference light detector, the reference light with high precision. Moreover, since the light in the sensitivity wavelength range of the measurement light detector, of the measurement light, is not cut, the detection of the measurement light by the measurement light detector is not prevented.

Preferably, in the interferometer described above, the reference light detector is formed with a silicon photodiode, and the wavelength of the laser light is equal to or less than 1100 nm.

Since the sensitivity wavelength range of the silicon photodiode is equal to or less than 1100 nm, when the wavelength of the laser light is equal to or less than 1100 nm, it is possible to reliably detect the laser light with the silicon photodiode.

Preferably, in the interferometer described above, the reference light source is formed with an end surface on a light emission side of a light guide member that takes in and guides light emitted from a light emission surface.

The light beam emitted from the light emission surface is guided by the light guide member, and thus it is possible to reduce the effect of heat generated from the light emission surface on an optical system in a stage subsequent to the light guide member, and to increase the flexibility of the arrangement of the light emission surface.

Preferably, a spectrometer described above includes: the interferometer described above; a signal processing portion that generates, based on a result of detection by the reference light detector of the interferometer, a signal indicating timing at which an output from the measurement light detector is sampled; and a spectrum generation portion that samples the output from the measurement light detector in synchronization with the signal, and that generates a spectrum indicating an intensity of light per wavelength.

The spectrometer described above includes the interferometer described above, and thus it is possible to realize a small-sized spectrometer. In the interferometer, even when the measurement light includes the light in the sensitivity wavelength range of the reference light detector, since the reference light detector can detect the reference light with high precision, the signal processing portion can generate the sampling signal based on the result of the detection by the reference light detector, and the spectrum generation portion samples the output from the measurement light detector in synchronization with the sampling signal to generate a spectrum, with the result that it is possible to perform a spectroscopic analysis with high precision based on the spectrum.

INDUSTRIAL APPLICABILITY

The interferometer of the present invention can be utilized for, for example, a Fourier transform spectrometer.

LIST OF REFERENCE SYMBOLS 1 interferometer
2 computation portion (spectrum generation portion)
11 measurement light source
13 BS (first beam splitter)
15 fixed mirror (first reflective member)
16 moving mirror (second reflective member)
18 measurement light detector
21 reference light source
23 optical path combination mirror (beam combiner)
24 optical path separation mirror (second beam splitter)
25 reference light detector
41 wavelength separation filter
42 wavelength separation filter
42a first optical filter
42b second optical filter
43 wavelength separation filter

The invention claimed is:

1. An interferometer comprising:
a measurement light source that emits measurement light;
a measurement light collimator optical system that collimates the measurement light emitted from the measurement light source;
a measurement light detector that detects the measurement light;
a reference light source that emits, as reference light, laser light whose wavelength is shorter than a sensitivity wavelength range of the measurement light detector;
a reference light detector that detects the reference light;
a reference light collimator optical system that collimates the reference light emitted from the reference light source;
a beam combiner that overlays an optical path of the measurement light and an optical path of the reference light;
a first beam splitter that separates, into two light beams, each of the measurement light and the reference light entering through the beam combiner;
a first reflective member that is arranged on an optical path of one of the two light beams separated by the first beam splitter and that reflects and makes each of the measurement light and the reference light enter the first beam splitter again;
a second reflective member that is arranged on an optical path of the other of the two light beams separated by the first beam splitter and that reflects and makes each of the measurement light and the reference light enter the first beam splitter again; and
a second beam splitter that separates, into two light beams, light which is subjected to interference in the first beam splitter and emitted by the first beam splitter, and that guides the light beams to the measurement light detector and the reference light detector, respectively, wherein, based on a result of detection by the reference light detector when the first reflective member and the second reflective member are relatively moved, the interferometer measures the measurement light while detecting an optical path difference of the two light beams separated by the first beam splitter,
wherein the measurement light emitted from the measurement light source includes light in a sensitivity wavelength range of the measurement light detector and light in a sensitivity wavelength range of the reference light detector, and
wherein the interferometer further includes a wavelength separation filter that cuts a wavelength range of the measurement light in at least a part of the sensitivity wavelength range of the reference light detector, wherein the wavelength separation filter comprises:
a first optical filter that is arranged in an optical path between the measurement light collimator optical system and the beam combiner; and
a second optical filter that is arranged in an optical path between the second beam splitter and the reference light detector,
wherein the first optical filter receives measurement light collimated by the measurement light collimator optical system and cuts the received measurement light in a first part of the sensitivity wavelength range of the reference light detector, wherein the first part includes the wavelength of the laser light, and
wherein the second optical filter receives one of the two light beams from the second beam splitter and transmits light to the reference light detector, wherein the transmitted light comprises light having a wavelength of the reference light source, and wherein the second optical filter cuts the received one of the two light beams in a second part of the sensitivity wavelength range of the reference light detector that is exclusive of the first part of the sensitivity wavelength range of the reference light detector.

2. The interferometer of claim 1,
wherein the first optical filter cuts, of the light included in the wavelength range of the measurement light, light from a wavelength shorter than a shortest wavelength in the sensitivity wavelength range of the reference light detector to a wavelength longer than the wavelength of the laser light but shorter than a longest wavelength in the sensitivity wavelength range of the reference light detector, and
the second optical filter cuts, of the light included in the wavelength range of the measurement light, light from a wavelength longer than the wavelength of the laser light but shorter than the longest wavelength in the wavelength range cut by the first optical filter to a wavelength longer than the longest wavelength in the sensitivity wavelength range of the reference light detector.

3. The interferometer of claim 1,
wherein the reference light detector is formed with a silicon photodiode, and
the wavelength of the laser light is equal to or less than 1100 nm.

4. The interferometer of claim 1,
wherein the reference light source is formed with an end surface on a light emission side of a light guide member that takes in and guides light emitted from a light emission surface.

* * * * *